United States Patent Office 3,422,435
Patented Jan. 14, 1969

3,422,435
DIGITAL INTEGRATOR
Harvey G. Cragon and Samuel K. Smith, Dallas, Tex., assignors to Texas Instruments Incorporated, Dallas, Tex., a corporation of Delaware
Filed Dec. 5, 1966, Ser. No. 599,071
U.S. Cl. 343—17.1
Int. Cl. G01s 7/28; G06j 1/02
9 Claims

ABSTRACT OF THE DISCLOSURE

Disclosed herein is a digital video integrator described in conjunction with a radar system which receives periodically recurring signals. By recirculating the signals through the integrator, a signal-to-noise ratio enhancement is effected. The integrator includes an "$n$" word parallel shift register or other suitable digital storing means which stores and delays the digital video signals by a predetermined time period which in a radar environment equals the reciprocal of the pulse repetition frequency. The output of the storage register is connected to a feedback attenuator which attenuates and presents the attenuated digital signal to an algebraic summing devied that combines the attenuated digital representation with the next periodically recurring signal and transmits the result to the storage register.

---

This invention relates to integrators and more particular to an apparatus for digitally integrating periodically recurrent signals.

In a radar system, the video signal derived from received, target-reflected echo signals consists of a series of pulses occupying a time interval equal to one pulse repetition period of the radar system. This series recurs periodically at the pulse repetition frequency of the radar system. Superimposed on this recurring series of echo pulses in a random signal resulting from the combined effects of ground, sea, or precipitation clutter and noise signals generated within the receiver of the radar system. This random clutter signal makes it difficult, if not impossible, to detect small amplitude received echo signals by the use of nonintegrating radar receivers.

The video integration of radar echo signals is performed in order to provide signal-to-noise improvement. If the signal of interest is sustained over a number of pulse repetition periods and the noise or clutter is random over the same time period, the signal of interest will be magnified by integration and the clutter or noise will tend to decrease relative to the signal of interest, thus providing a greater signal-to-noise ratio.

It is therefore an object of the present invention to provide a digital video integrator that will give a substantially improved signal-to-noise ratio.

Another object of the invention is to provide a video integrator which includes a combining means into which the input signals are fed, the output of which is coupled to a digital storing means, there being a feedback loop which includes an attenuator that attenuates the output of the said storage means and the attenuated output is thereafter combined in the combining means with the succeeding input signal to thereby reduce the clutter or noise, on the one hand, and magnify the signal of interest, on the other.

It is a further object of the invention to provide a digital integrator which lends itself to microminiaturization with the accompanying savings in size, weight and improved reliability over prior art systems.

Another object of the invention is to provide a method for digitally integrating periodically recurring signals.

Other objects and features of the invention will become readily understood from the following detailed description and appended claims when read in conjunction with the accompanying drawings, in which like reference numerals designate like parts throughout the figures thereof, and in which:

FIGURE 4 shows the timing waveforms for the system of FIGURE 3, while

Figure 1:
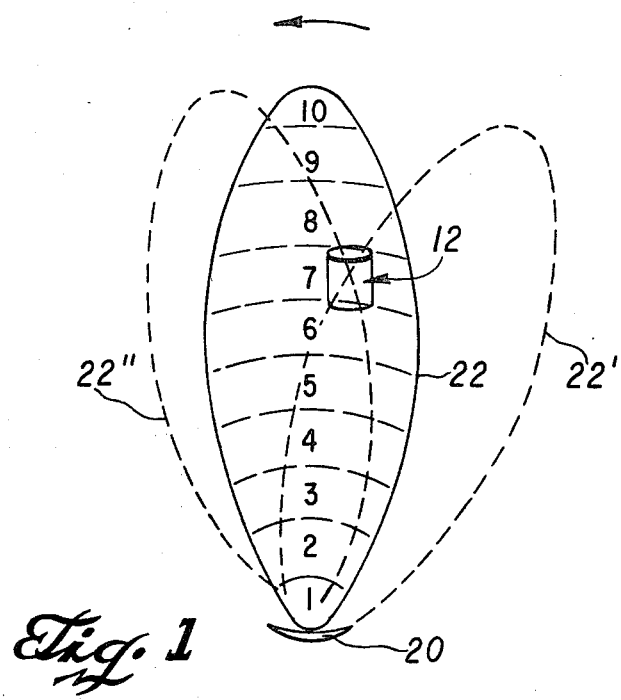
FIGURE 1 is a pictorial representation of the beam-width of a radar antenna.

Referring now to FIGURE 1, there is illustrated a radar antenna 20 having an antenna pattern or beamwidth 22. For purposes of explanation the antenna pattern 22 is subdivided into range bins 1–10. The radar transmitter emits a high energy, high frequency electromagnetic pulse at a frequency defined as the pulse repetition rate. The time required for the pulse to be transmitted to a target (such as target 12) and return to the antenna defines the range of the target from the receiver. It is obvious that the return from a target in range bin 1 will occur earlier in time than the return from a target in range bin 10. In the time interval between each transmitted pulse, there are reflected echo signals from bins 1–10 depending upon target location, which form a video signal giving target range information.

Many pulses are usually returned from a particular target on each radar scan and such pulses can be used to improve detection. The number of pulses returned from a point target as the radar antenna scans through its beamwidth is proportional to such factors as the antenna beamwidth, pulse repetition rate and antenna scanning rate. It would not be uncommon for a radar to produce 20 or more hits from a point target on each scan. By summing or integrating the echo pulses, an improved detection probability is achieved.

Figure 2:
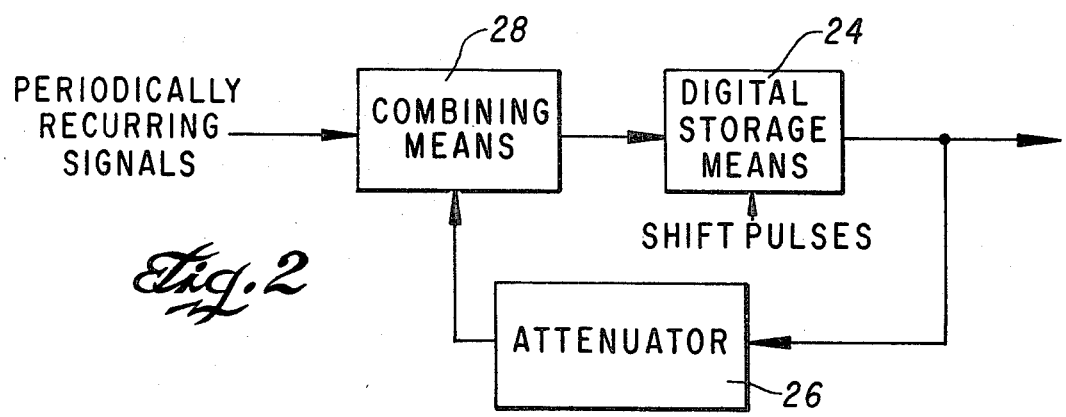
FIGURE 2 is a simplified block diagram of the digital integrator of this invention.

FIGURE 2 illustrates a block diagram of the general structure of the integrator of the present invention. The integrator comprises a digital storing means 24, the output thereof being connected into a feedback loop which includes an attenuator 26 that provides an attenuated representation of the output from the digital storing means. Periodically recurring signals representative of the echos from the targets and the attenuated representation of these signals from the attenuator 26 are algebraically summed and digitally presented to the digital storage means 24 by combining means 28.

The above described integrator operates on the principle that the clutter or noise amplitude (hereafter referred to as the noise amplitude or simply noise) is random while the echo signal from a target is coherent from transmitted pulse to transmitted pulse. The periodically recurring signals are integrated in the recirculating loop (formed by closing feedback via attenuator 26 to combining means 28 and digital storage means 24) thus magnifying the signals of interest while the noise (which is random in nature) will tend to decrease relative to the signal of interest. As a result, the signal-to-noise ratio is greater in the recirculating loop than the corresponding ratio at the input to the combining means 28. Obviously, the improvement in signal-to-noise ratio is a function of the number of successive target signals which are stored as a sum in the recirculating loop, that is, as a sum of the number of integrations. The factors determining the number of target signal returns has been described previously with respect to FIGURE 1.

It should be noted that the attenuator 26 shown in FIGURE 2 may be connected between combining means 28 and digital storage means 24. The feedback loop from the output of digital storage means 24 would then be connected directly to combining means 28.

Figure 3:
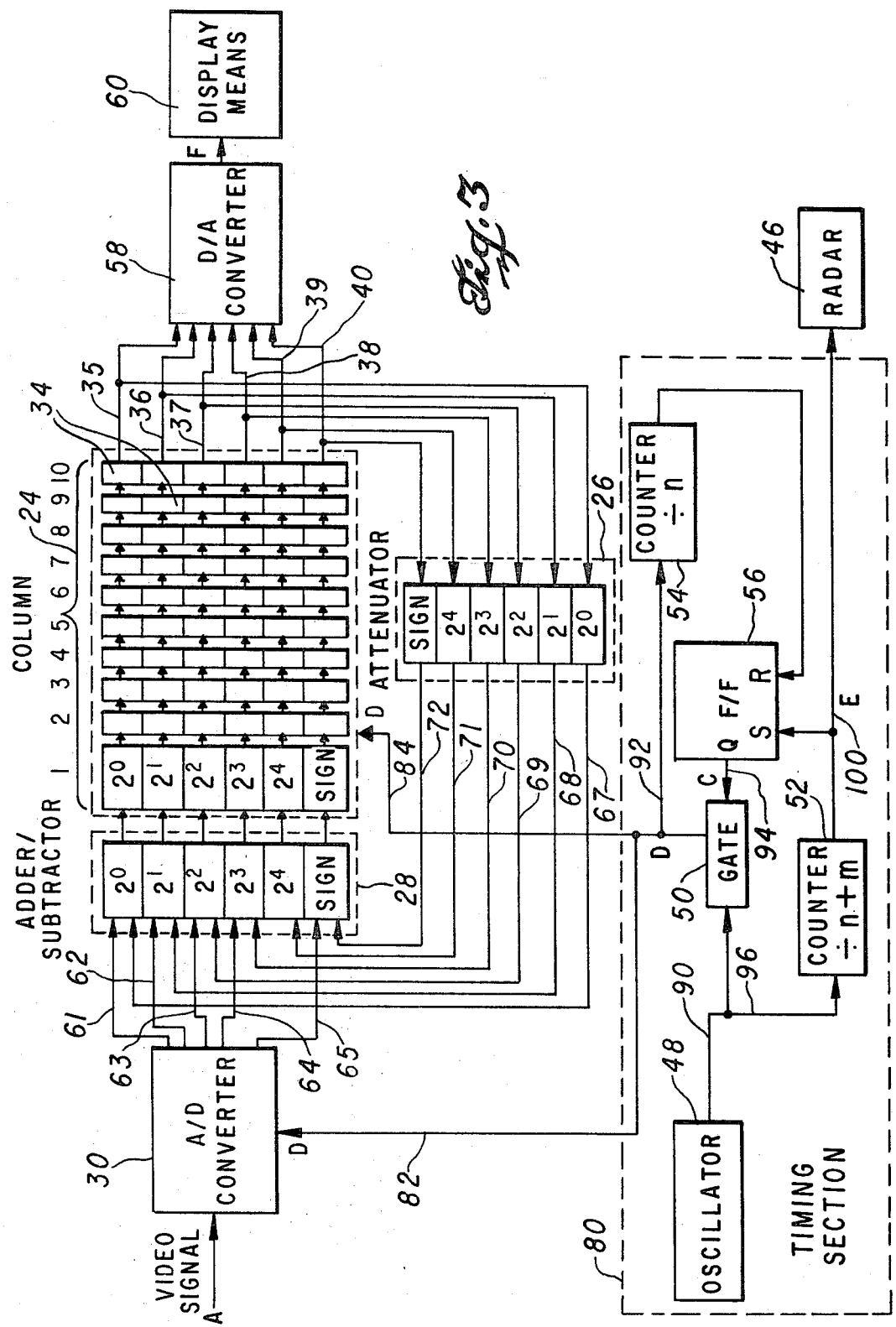
FIGURE 3 is a block diagram of one embodiment of the digital integrator.

FIGURE 3 illustrates a detailed block diagram of one embodiment of the digital integrator. The periodically recurring signals (video signals) representative of the target-reflected echo returns from range bins 1–10 (of FIGURE 1) are converted into digital representations by the analog-to-digital (A/D) converter 30. The main component of the integrator is the digital storing means 24 which may be, by way of example, an $n$ word parallel digital storing means, such as a shift register or a plurality of magnetic cores appropriately connected. The length of the shift register is determined by the number of samples of the video signals required during one intrapulse period (where intrapulse period is defined as the time period between consecutive transmitted pulses). The storing means 24 both stores and delays the digital data included therein for one period of the periodically recurring signals.

It is assumed for purposes of explanation that the digital storing means 24 comprises six (6) rows and ten (10) columns of flip-flops 34 ($n$ being equal to 10 in this case), five (5) of the flip-flops in each column being for the storing of the binary digit representing an item of information and the sixth flip-flop being utilized to store the "sign" of the digital signal, that is, whether the voltage representation of the information is positive or negative. Information, after being digitized by the A/D converter 30, is inserted into the digital storing means 24 in parallel form and is successively shifted by shift pulses (waveform D of FIGURE 4) from timing section 80 through the digital storing means until this information appears in the 10th column thereof where conductors 35–40 connect the outputs of this last column to digital attenuator 26. The digital attenuator multiplies the digital word present in the 10th column of digital storing means 24 by an appropriate feedback factor less than unity. The attenuator gain must be less than unity to prevent oscillation from occurring. The output conductors 35–40 from digital storing means 24 are also connected to digital-to-analog (D/A) converter 58 whose output is connected to display or control means 60.

The operation of the integrator illustrated in FIGURE 3 will now be described in conjunction with the waveform shown in FIGURE 4. It will be assumed for the purpose of this description that the radar is pulsed at a pulse repetition rate as illustrated by waveform B in FIGURE 4. Waveform B consists of a plurality of pulses, each pulse being followed by a time (intrapulse period) during which the radar returns are received. Two complete repetition periods and a portion of a third are shown by this waveform. Waveform A illustrates the video return detected by the receiver (not shown) after the initiation of the pulses during the pulse repetition period. Any targets that are detected will show up as pulses in the video waveform whereas the time at which the pulse occurs in the waveform from the initiation of the pulse during the intrapulse period is proportional to the range of the target from the radar antenna 20. It will be assumed that the pulse during pulse repetition period 1 of waveform B is the first one to detect target 12 (of FIGURE 1). This means that the antenna scan pattern is in a position as defined by 22'. Since the target 12 falls within range bin 7, a pulse will appear in the corresponding range bin of the video return, that being range bin 7. This target will be detected as long as it is present within the range pattern of antenna 20; meaning that the target will be present during the time that the antenna scan pattern is in the position defined by 22 and will be detected until the scan pattern rotates and reaches a position defined by 22". When the scan pattern rotates past the position of 22", target 12 will no longer be detected by the radar. The number of video returns which will indicate the presence of target 12 is dependent upon the pulse repetition rate, the antenna beam width and the antenna scan rate. It is assumed that antenna 20 returns from the target will be received by the radar. In waveform A of FIGURE 4, there is shown only two of the twenty returns which would be expected from target 12 and is shown by the presence of a pulse in range bin 7 during the first two pulse repetition periods. It should also be noted that there are noise components present which could lead to erroneous detection information by the radar. It is this noise component that will be substantially reduced by the integrator of the present invention.

It will be assumed for simplicity of description that the integrator of FIGURE 3 is for the first time beginning to process incoming video signal information. Waveform A has an appropriate bias (fixed voltage) shown in FIGURE 4, which is set such that the average value of the noise over one intra-pulse period is zero. Waveform A then is fed into analog-to-digital converter 30. Converter 30 samples the analog voltage present during each range bin time interval and produces a four bit digital word plus a sign representative of the analog signal. Remembering that the noise amplitude is random, A/D converter 30 will digitize sequentially the magnitude of the noise components present in the first six range bins. That is, converter 30 will sample and digitally present to the adder/subtractor 28 a four bit word plus the sign representative of the noise level in range bin 1 with the least significant bit occurring on conductor 61 and the most significant bit occurring at conductor 64. This information is then transferred into column 1 of the digital storing means 24. At this time, it is assumed that the output at conductors 67–72 from digital attenuator 26 is zero. Converter 30 will then sample the analog voltage present in range bin 2 of waveform A, digitize the result and transfer the information into adder/subtractor 28 which, in turn, presents the information into column 1 of the digital storing means, while the digital information previously stored in that memory column will have been shifted in parallel for mto column 2. This sequence of events continues until the analog voltage of range bin 7 representative of target 12 is sampled, the digital representation of which is fed into adder/subtractor 28 and subsequently into column 1 of digital storing means 24. This sequence again continues until all ten range bins have been sampled. At that time, digital storing means 24 will be completely filled, each column of the storing means being filled with the digital representation of the magnitude of the signal in the range bin for the appropriate pulse repetition period.

When the digital storing means 24 has stored the information from intra-pulse period 1 as has been hereinbefore described, the digital information in column 10 will be the magnitude of the video return in range bin 1, column 9 will have the same information about range bin 2, column 8 will have the same information about range bin 3 and so on down to column 1 which will have the digital representation of the analog voltage present in range bin 10. Clock pulses which time the sampling of the video signal by converter 30 are provided over conductor 82 from the timing section 80, while the shift pulses for the digital storing means 24 are provided over conductor 84 from the same timing source. These shift pulses are shown in waveform D of FIGURE 4.

The output signal from column 10 of the digital storing means is fed via conductors 35–40 to the input of digital attenuator 26. This digital attenuator attenuates the digital representation of the information presented at its input by some appropriate factor less than unity, such as, for example, 0.85. The gain of the attenuator 26 must be made less than unity if the integrator is to be stable or non-oscillatory. Accordingly, an attenuated representation of the digital magnitude of the signal present in range bin 1 will be presented at terminals 67–72 as inputs to the adder/subtractor 28 at the initiation of the second pulse repetition period. Simultaneously, A/D converter 30 is processing the periodically recurring video information included in the second pulse repetition period. It should be remembered that the target information in this second period will be similar to that in the first period, the primary difference being the noise amplitude present in range bins 1–6 and 8–10, the noise amplitude in range bin 7 being combined with the amplitude of the target signal. Converter 30 will digitize the analog signal in range bin 1 (which will be noise) and present this digital representation to adder/subtractor 28 via conductors 61–65, the adder/subtractor simultaneously receiving the attenuated digital representation of the signal from attenuator 26. These two digital representations of the noise levels in range bin 1 will be algebraically added with the sum being shifted into column 1 of digital storing means 24. Since the noise is random over a series of pulse repetition periods, the digital representation of the summed noise will decrease relative to the signal of interest with each recirculation (integration) through the digital storing means. This process will occur (in the example now being discussed) for range bins 1–6 and 8–10 which have only noise signals present.

In contrast with the above, when the digital representation of range bin 7 in pulse repetition period 2 is presented to the adder/subtractor 28, an attentuated representation of the signal in range bin 7 for intra-pulse period 1 will appear at conductors 67–72 and will be algebraically added with the representation of that signal occurring in intrapulse period 2. This sequence continues for twenty-inrapulse periods, the number of periods that the antenna beam width of antenna 20 includes target 12 within its pattern. Accordingly, 20 integrations are performed upon the video signal.

The summed digital output from column 10 of the digital storing means 24 is also sent via conductors 35–40 to a digital-to-analog (D/A) converter 58. The output of converter 58 is supplied, in turn, to a display or control means 60. The output from the D/A converter 58 representative of the integrated output from the system is illustrated in waveform F of FIGURE 3. It will be noted that the magnitude of the signal in range bin 7 is successively increased by the integration which occurs during each recirculation of range bin 7 through the integrator. For example, if range bin 7 had a signal level of 1.0 during intrapulse period 1, the first cycle through the integrator would provide a signal level of 1.0. The second time through the integrator the output would be at a level of $1+1.0 \times 0.85 = 1.85$ (the attenuator is set to 0.85). The third time through the integrator the level output would be $1+1.85 \times 0.85 = 2.57$. This process continues for twenty integrations, which means that the level in range bin 7 gets successively larger. This is to be contrasted with the noise levels in range bins 1–6 and 8–10 which, over twenty integrations, will tend to cancel out, thus improving the signal-to-noise and/or clutter ratio. This process is illustrated in waveform F of FIGURE 4.

Referring now to the timing section 80 for the video integrator, oscillator 48 provides the clock pulses for the system. The timing section 80 supplies a number of shift pulses to the digital storing means 24 corresponding to the number of columns in the storing means. In the system described in connection with FIGURE 3, this digital storing means has ten columns; therefore ten shift pulses are required to shift the digital information across the length of the storing means. Also, A/D converter 30 requires a like number of pulses in order to sample the video signals once per range bin.

Consequently, the output of oscillator 48 is connected via conductor 90 to gate 50; this gate being a standard-type "AND" gate by way of example. The output of this gate supplies the ten shift pulses via conductor 84 to the digital storing means 24 and also the timing pulses required by the A/D converter 30 via conductor 82. This is accomplished by having flip-flop 56 feed a "1" (represented by a high voltage as shown in FIGURE 4, waveform C) to the input of the "AND" gate. As long as a "1" is present on conductor 94 to the input of gate 50, the clock pulses from oscillator 48 are fed through gate 50 to conductors 82 and 84 (FIGURE 4, waveform D). Counter 54 counts the number of pulses from the output of gate 50 and when $n$ pulses (where $n=10$, in this case) have been counted, a pulse is sent to the reset side of flip-flop 56 which resets the output to the "0" (low voltage) position. During the time that the flip-flop 56 is being reset and its output is in the "0" position, gate 50 will inhibit the passage of clock pulses to the video integrator.

Figure 4:
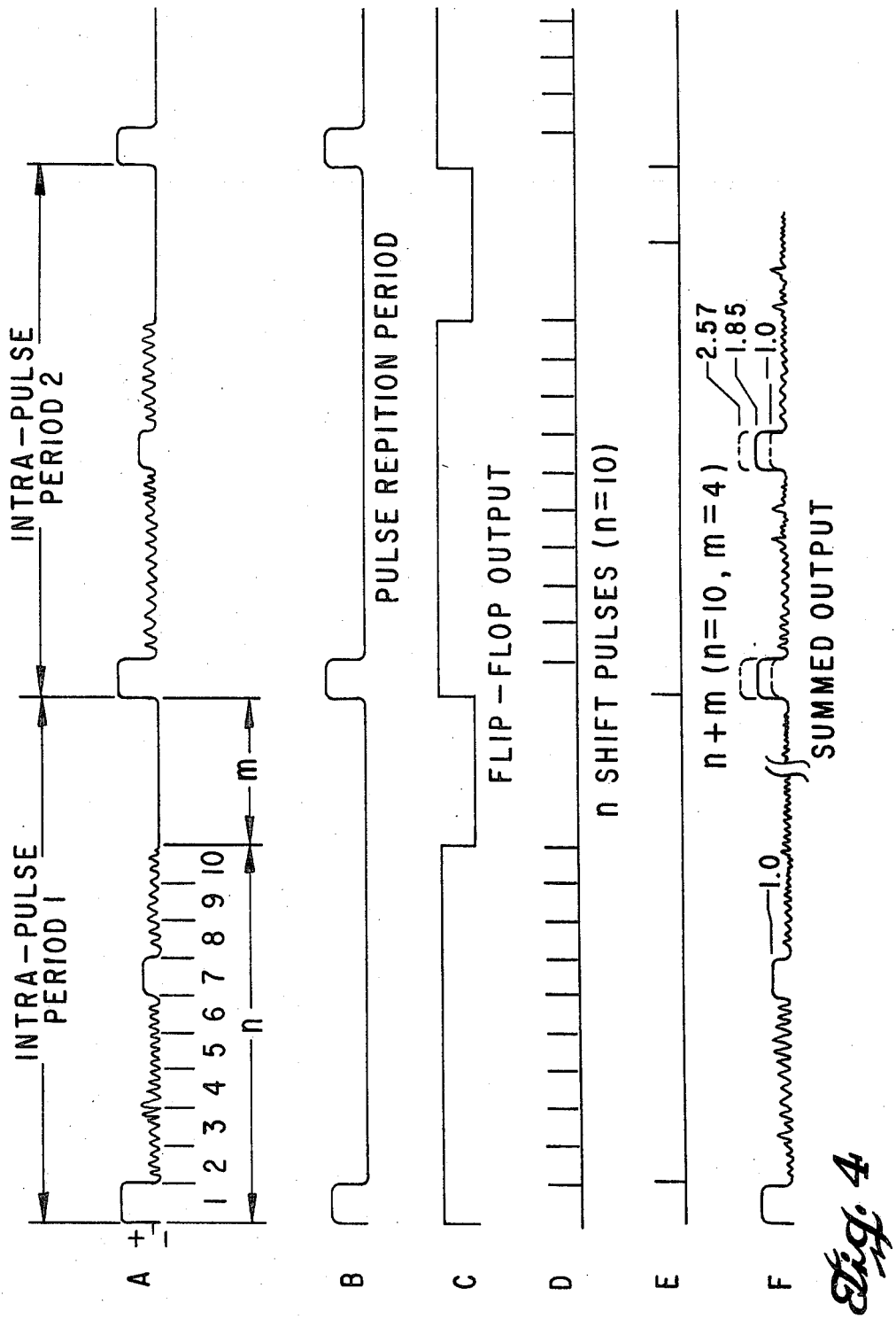

It should be noted in waveform A, FIGURE 4, that there is a dead time $m$ from the end range of bin 10 to the initiation of the next pulse repetition pulse. This dead time is provided to allow reset sweeps and other circuits in the radar to recover. In FIGURE 4 this dead time, designated as $m$ additional counts, is equal to 4 pulses, for example. The output of oscillator 48 is connected to counter 52 via conductor 96. Counter 52 counts down the oscillator output pulses by $n+m(n+m=14$, in this example), and when the counter has counted down $n+m$ number of pulses, an output pulse (waveform E of FIGURE 4) will set flip-flop 56 and also supply the master trigger to the radar 46 over conductor 100. Accordingly, when an output pulse occurs on conductor 100, flip-flop 56 will enable gate 50, allowing the shift pulses once again to be supplied to the digital storing means 24 and to the converter 30. The length of time of $n+m$ pulses is equal to the pulse repetition rate of the radar period. Thus, synchronization of the radar with the video integrator is provided by this simple method of counting down by $n+m$ pulses. It should be noted that each integration is performed in a time period less than one pulse repetition period; that is, the integration requires $n$ counts while the pulse repetition rate equals $n+m$ counts. It should also be noted that, although $m$ is shown as a constant time period, it may vary to thereby effect an intra-pulse period length which will be of varying duration (but, of course, longer than the integration period $n$).

Figure 5:
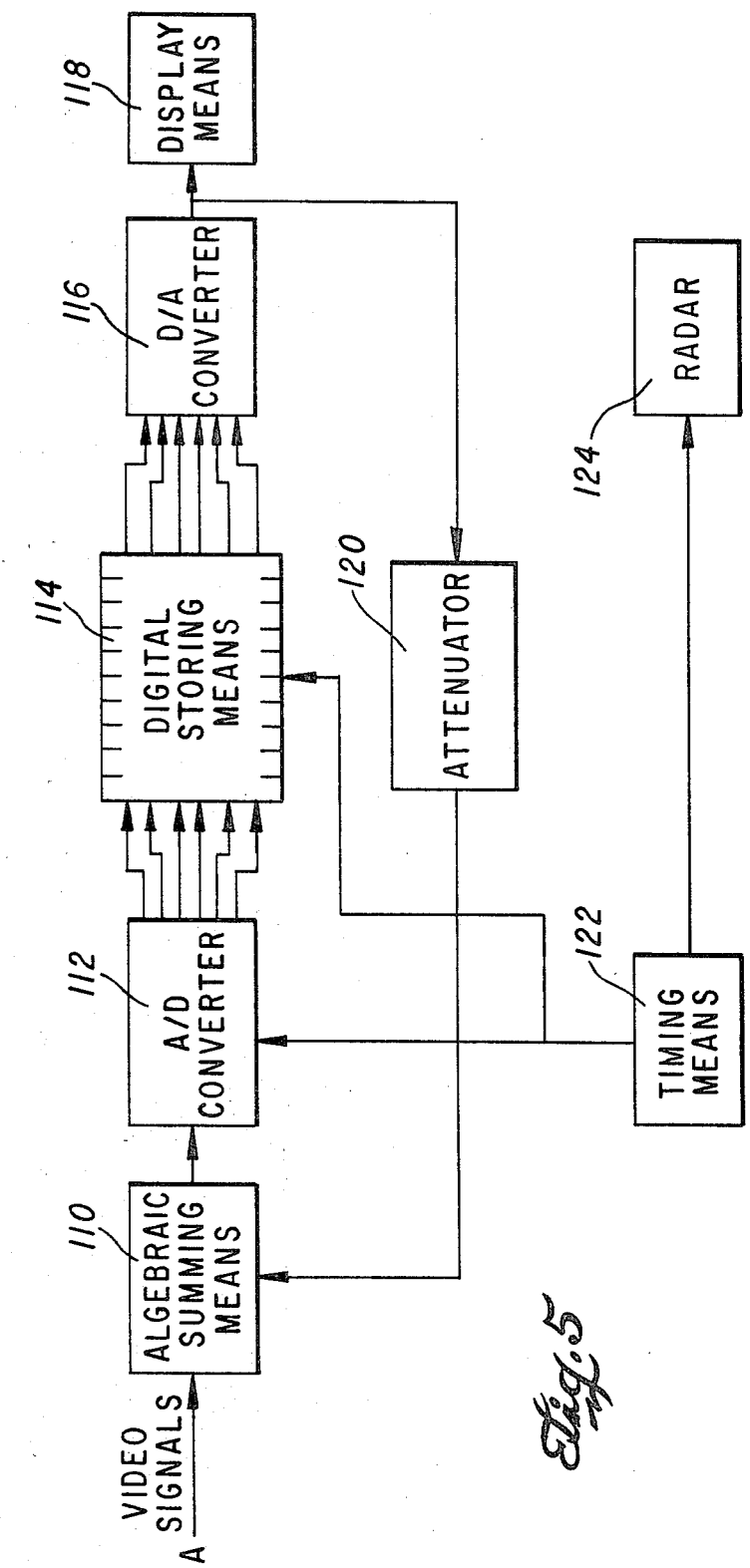
FIGURE 5 is a block diagram of another embodiment of the digital integrator.

A second embodiment of the video integrator is illustrated in block diagram form in FIGURE 5. The integrator of FIGURE 5 is comprised of an analog algebraic summing means 110, the output of which is fed into an analog-to-digital converter 112. The digital output of converter 112 is fed into digital storing means 114 which may be constructed in the same manner as storing means 24 of FIGURE 3. The digital output from the storing means 114 is fed into a digital-to-analog converter 116, the output of said converter 116 being connected to a display or control means 118 and said output is also fed into an analog attenuator 120. This analog attenuator may be as simple as a potentiometer, by way of example, and will have a gain less than unity for the same reasons given with respect to attenuator 26 of FIGURE 3, which is to provide a stable, non-oscillatory system. The output of attenuator 120 forms the second input to the algebraic summing means 110. Summing means 110 may be an analog operation amplifier well known in the art. Timing pulses for the system are provided by timing means 122 which are substantially the same as timing section 80 shown in FIGURE 3. The timing means provides the pulses necessary to synchronize the pulse repetition rate of radar 124. The timing means further provides the necessary shift pulses for storing means 114 and the pulses required to sample the range bins of the video signals in the analog-to-digital converter 112.

Operationally, the integrator of FIGURE 5 is very similar to that of FIGURE 3. A video signal (such as that shown in waveform A of FIGURE 4) is fed into algebraic summing means 110. The output of the summing means 110 is then digitized by the A/D converter 112 and presented to the digital storing means 114. The range bins of waveform A of FIGURE 4 are successively sampled and the digital representations thereof stored in and shifted through the digital storing means 114. The output of the storing means is fed into digital-to-analog converter 116 which converts the digital information back into analog form for use in display or control means 118 and is further supplied to analog attenuator 120. The output of the attenuator 120 forms the second input to algebraic summing means 110. The summing means 110 then algebraically sums the attenuated video-representations during the preceding intra-pulse period with the video occurring during the next intra-pulse period. This process is repeated for a predetermined number of integrations in the same manner as was described with respect to FIGURE 3.

Although the present invention has been described and illustrated in terms of a specific apparatus, it will be apparent that changes and modifications can be made without departing from the spirit and scope of the invention as defined by the appended claims.

What is claimed is:

1. In a radar, an integrator for processing video signals periodically recurring at the pulse repetition rate of said radar, said pulse repetition rate being divisible into $n+m$ time increments, comprising:
    (a) digital storage means having $n$ locations for storing digital signals applied to its input,
    (b) timing means for retaining said digital signals in said storage means for $n+m$ time increments,
    (c) means, including attenuator means, for combining the output signal from said storage means with a corresponding increment of one of said recurring video signals to produce a combination signal which is less than the sum of the signals combined, and
    (d) means applying said combination signal to the input of said storage means.

2. An integrator for processing periodically recurring signals having a given repetition period, said period being divisible into $n+m$ time increments, comprising:
    (a) digital storage means having $n$ locations for storing digital signals applied to its input,
    (b) timing means for retaining said digital signals in said storage means for $n+m$ time increments,
    (c) means, including attenuator means, for combining the output signal from said storage means with a corresponding increment of one of said recurring signals to produce a combination signal which is less than the sum of the signals combined, and
    (d) means applying said combination signal to the input of said storage means.

3. An integrator according to claim 2 wherein said timing means varies the duration of $m$.

4. An integrator according to claim 2 wherein said attenuator means is a digital attenuator.

5. An integrator according to claim 2 wherein said attenuator means is an analog attenuator.

6. An integrator according to claim 2 wherein said combining means further includes an analog-to-digital converter and a digital adder/subtractor, the digital output of said converter being electrically interconnected to said adder/subtractor.

7. An integrator according to claim 2 wherein said first-named means includes an $n$ word parallel shift register.

8. An integrator according to claim 7 wherein said timing means provides $n$ shift pulses to said register for each repetition period.

9. An integrator according to claim 2 wherein said combining means further includes an analog algebraic summing means and an analog-to-digital converter, the analog output of said summing means being electrically interconnected to said analog-to-digital converter.

References Cited

UNITED STATES PATENTS

| | | | |
|---|---|---|---|
| 3,108,272 | 10/1963 | Sweeney | 343—5 |
| 3,192,371 | 6/1965 | Brahm | 235—150.51 X |
| 3,201,705 | 8/1965 | Hanulec et al. | 343—17.1 X |
| 3,311,894 | 3/1967 | Chudleigh | 343—5 |
| 3,312,969 | 4/1967 | Halsted | 343—5 |

RODNEY D. BENNETT, *Primary Examiner.*

C. L. WHITHAM, *Assistant Examiner.*

U. S. Cl. X.R.

235—150.51